United States Patent [19]
Brewer

[11] 4,025,737
[45] May 24, 1977

[54] REPEATER MONITORING AND FAULT LOCATION
[75] Inventor: Sherman Theodore Brewer, Little Silver, N.J.
[73] Assignee: Bell Telephone Laboratories, Incorporated, Murray Hill, N.J.
[22] Filed: Mar. 24, 1976
[21] Appl. No.: 669,857
[52] U.S. Cl. .................................. 179/175.31 R
[51] Int. Cl.² ..................................... H04B 1/60
[58] Field of Search ............ 179/175.31 R, 175.3 F, 179/175.3 R, 15 BF

[56] References Cited
UNITED STATES PATENTS

| 2,686,849 | 8/1954 | Thomas | 179/175.3 R |
|---|---|---|---|
| 2,843,668 | 7/1958 | Ilgenfritz | 179/175.31 R |
| 3,049,596 | 8/1962 | Sonneborn | 179/175.31 R |
| 3,637,955 | 1/1972 | Tilly et al. | 179/175.31 R |

Primary Examiner—Douglas W. Olms
Attorney, Agent, or Firm—Stephen M. Gurey

[57] ABSTRACT

A repeater monitoring and fault location system is disclosed for a submarine cable system which includes repeaters of the type having separate high band and low band amplifiers for two-way transmission over one cable. Each repeater includes an oscillator for generating a signal at a frequency in the cutapart region between the high frequency and low frequency transmission bands and which is uniquely identifiable to that repeater. A test tone at a frequency in the low frequency transmission band is transmitted from the low frequency transmitting end along the cable. The low band amplifiers intermodulate the local oscillator signals with the transmitted test tone to generate a series of seond order modulation products at frequencies in the high frequency band. A low pass filter, designed to have a controlled moderate level of loss in the portion of its high frequency stop band over which the frequencies of the second order modulation components lie, is connected to the output of each low band amplifier. A series of second order modulation components at frequencies uniquely identifiable to each repeater is coupled to the high frequency transmitting path for transmission to the low frequency transmitting end. By comparing the magnitudes of the returned modulation components with reference levels, the modulation performance of each low band amplifier is determined and a faulty amplifier can be located.

12 Claims, 5 Drawing Figures

REPEATER MONITORING AND FAULT LOCATION

BACKGROUND OF THE INVENTION

This invention relates to modulation monitoring and fault location of repeaters in submarine cable systems.

Submarine cable systems in which one cable is used for signal transmission in both the East to West and West to East directions along the cable, one signal beng transmitted in a high frequency band and the other signal being transmitted in the low frequency band, require repeates periodically spaced along the coaxial cable to reamplify the transmitted signals. Separate high band and low band amplifiers are employed in one type of repeater used in such coaxial cable systems. Since the repeaters and their associated amplifiers are inaccessible for testing once a submarine coaxial cable is laid, it is desirable to test repeater performance by applying test signals from the transmitting ends of the system. By examining the responses of the repeaters to the test signals, the performance of the individual repeaters can be determined. A well-known technique for measuring the performance of repeater amplifiers of repeater amplifiers is to measure the magnitude of the modulation components generated when test signals at two distinct frequencies are applied to the inputs of repeater amplifiers. The repeater amplifierss intermodulate the applied test signals and generate modulation components which are indicative of the performance of the repeater amplifiers. Prior art repeater testing systems have required various component additions at each repeater to return a signal representative of the modulation performance of the repeaters to a transmitting end. This additional equipment has undesirably added to the cost and complexity of each repeater in the coaxial cable system.

SUMMARY OF THE INVENTION

The object of the present invention is to measure the modulation performance of repeater amplifiers in a coaxial cable system and locate faulty units.

In accordance with the present invention the modulation performance of the high and low band amplifiers in a repeater having separate high and low frequency paths is monitored by measuring, at predetermined frequencies, the magnitudes of the modulation components returned to each transmitting terminal of the coaxial cable. In particular, two test tones are applied to the repeater amplifier in the high frequency path which generates modulation components in the low frequency transmission band and two test tones are applied to the repeater amplifier in the low frequency path which generates modulation components in the high frequency band. A low pass filter at the output of the low band amplifier is designed to have a controlled moderate level of loss in the portion of its high frequency stop band in which the frequency of the second order modulation component generated by the low band amplifier lies. A portion of the energy of the second order modulation component generated by the low band amplifier is coupled to the high frequency transmission path of the repeater for transmission back to the low frequency transmitting terminal. The magnitude of the returned component is compared with a reference level to determine the modulation performance of the low band amplifier in the repeater. In a similar manner, a high pass filter at the output of the high band amplifier is designed to have a controlled moderate level of loss in the portion of its low frequency stop band in which the frequency of the second order modulation component generated by the high band amplifier lies. Part of the energy of the second order modulation component generated by the high band amplifier is thus coupled to the low frequency transmission path of the repeater for transmission back to the high frequency transmitting terminal. The magnitude of the returned component is compared with a reference level to determine the modulation performance of the high band amplifier in the repeater.

In the particular embodiment disclosed herein, each repeater in a coaxial cable system includes an oscillator which generates a signal having a frequency in the cutapart region between the high and low frequency transmission bands. Each repearter oscillator generates a signal at a frequency uniquely identifiable to that repeater. A signal at a frequency in the low frequency band is transmitted from the low frequency transmitting end of the cable and is intermodulated with the local oscillator signal by the low band amplifier at each repeater. The low pass filters at the outputs of the low band amplifiers are designed to have a controlled moderate level of loss over the portion of their high frequency stop bands at which the second order modulation components generated by each low band amplifier lie. The second order modulation components generated by the low band amplifiers are coupled back to the high frequency path. A series of second order modulation components at frequencies uniquely identifiable with each repeater is thus received at the low frequency transmitting end. By selectively tuning to each modulation component, the modulation performance of the low band amplifier at each repeater is monitored and a faulty amplifier located. Similarly, by transmitting a test signal from the high frequency transmitting end, the modulation performance of the high band amplifier at each repeater is monitored and a faulty amplifier located. A cable fault is located between two repeaters by noting the absence of returned modulation components from beyond a particular repeater in the coaxial cable system.

It is a feature of the present invention that modulation monitoring and fault location are readily performed with a minimum of additional apparatus at each repeater.

BRIEF DESCRIPTION OF THE DRAWINGS

FIG. 3 shows the filter loss versus frequency curves of the high and low band output filters for the repeater of FIG. 2. In addition, FIG. 3 shows the high and low frequency transmission bands and the test frequency region located in the cutapart region between these two transmission bands;

DETAILED DESCRIPTION

Figure 1:
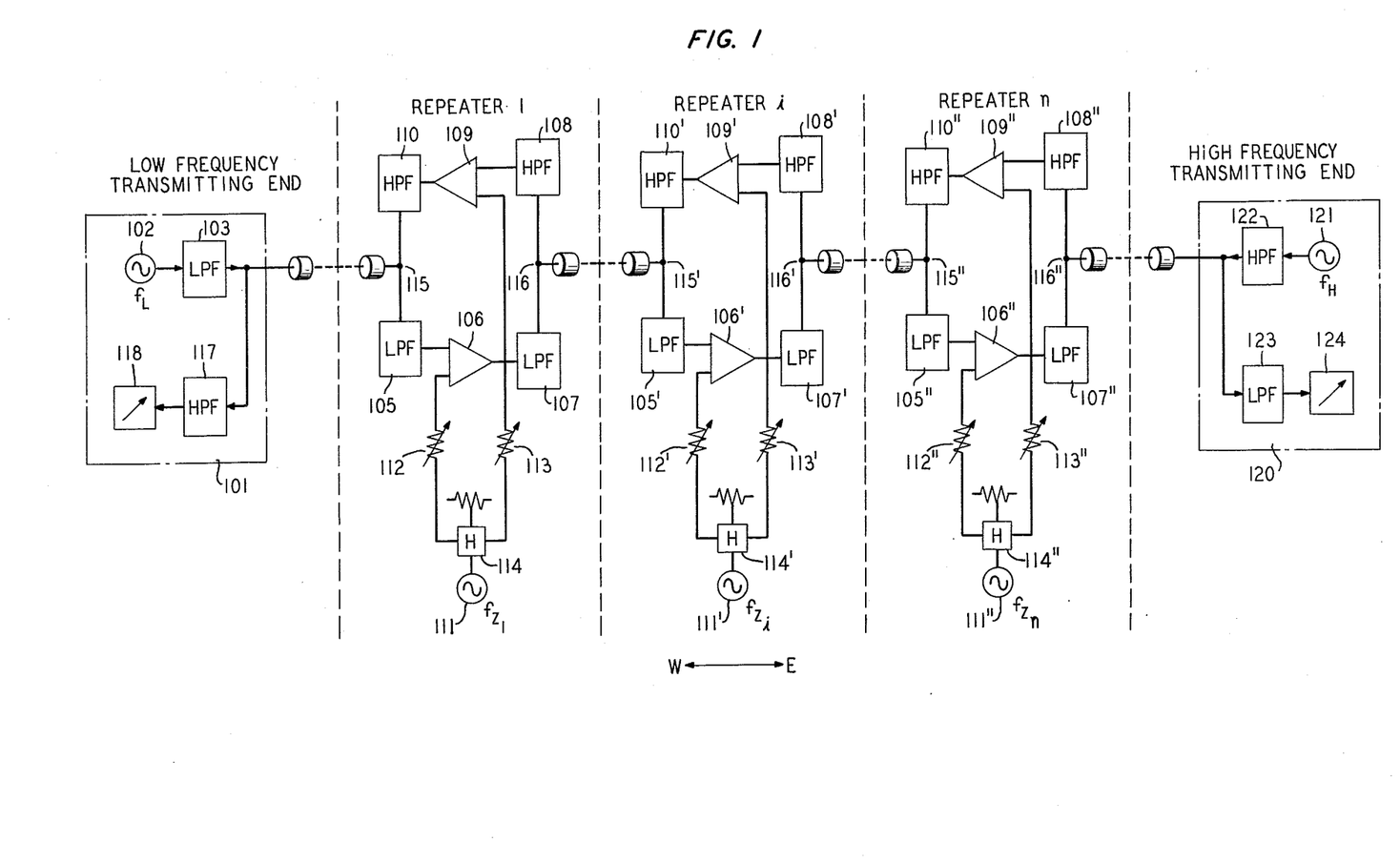
FIG. 1 shows a coaxial cable system employing the principles of the present invention.

A test set 101 is connected to the low frequency transmitting end of an undersea cable system as illustrated in FIG. 1. Similarly, a test set 120 is connected to the high frequency transmitting end of the undersea cable system. An oscillator 102, within test set 101, generates a test signal having a frequency $f_L$ lying in the low frequency transmission band. An oscillator 121, within test set 120, generates a test signal having a frequency $f_H$ lying in the high frequency transmission band. The low frequency test signal is passed through a low pass filter 103 and coupled onto the coaxial cable system for transmission from West-to-East over the low frequency band. Similarly, the high frequency test signal is passed through a high pass filter 122 and coupled onto the coaxial cable system for transmission from East-to-West over the high frequency band.

Figure 2:
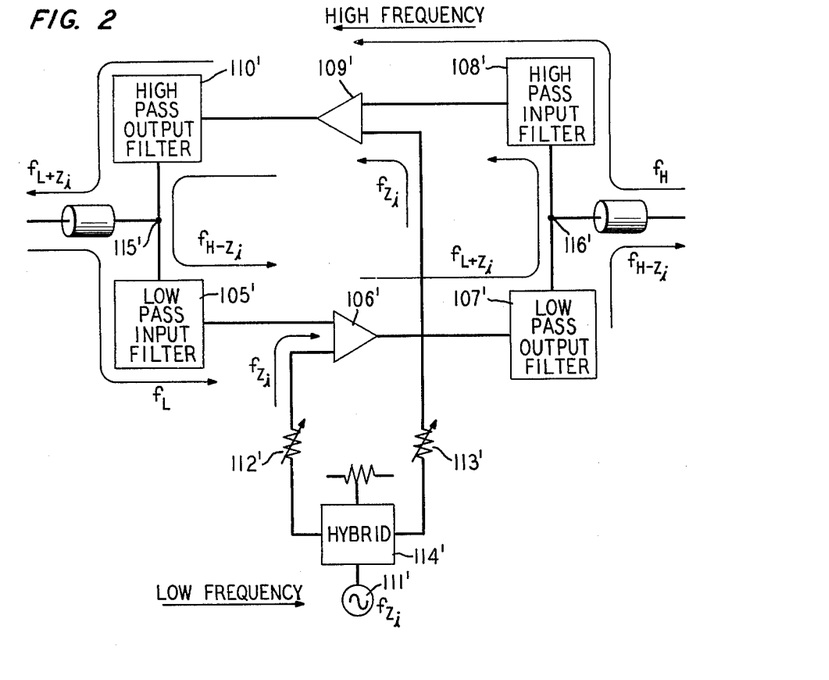
FIG. 2 shows a repeater employed in the coaxial cable system of FIG. 1.

There are n repeaters periodically spaced along the undersea cable system to reamplify the transmitted signals. For purposes of illustration, only repeater no. 1 nearest the low frequency transmitting end, repeater no. n nearest the high frequency transmitting end, and an intermediate repeater, labeled for these purposes as repeater $i$, are shown in FIG. 1. The signal paths through intermediate repeater no. $i$ are shown in FIG. 2. As illustrated in FIGS. 1 and 2, each repeater has a similar design. Associated with each repeater, however, and to be described in detail hereinafter, is an oscillator which generates a test frequency uniquely identifiable to that repeater. Similar numerical designations are given to equivalent components in each repeater in FIGS. 1 and 2.

With reference to both FIG. 1 and FIG. 2, each repeater includes a low pass input filter 105, 105' and 105''; a low band amplifier 106, 106' and 106''; and a low pass output filter 107, 107' and 107''; all serially connected in a low frequency transmission path between two respective terminals 115 and 116, 115' and 116' and 115'' and 116''. The high frequency transmission path of each repeater similarly includes a high pass input filter 108, 108' and 108''; a high band amplifier 109, 109' and 109''; and a high pass output filter 110, 110' and 110''; all serially connected between respective terminals 116 and 115, 116' and 115' and 116'' and 115''. An oscillator 111, 111' and 111'' at each repeater generates test signals which are applied to the respective inputs of amplifiers 106 and 109, 106' and 109' and 106'' and 109'' through adjustable injection networks 112 and 113, 112' and 113' and 112'' and 113''. A hybrid network 114, 114' and 114'' at each repeater assures that there is negligible cross-coupling between the high frequency and low frequency transmission paths. Injection networks 112, 113, 112', 113', 112'' and 113'' are adjusted for a predetermined test signal level at the inputs of the high and low band amplifiers at each repeater.

Figure 3:
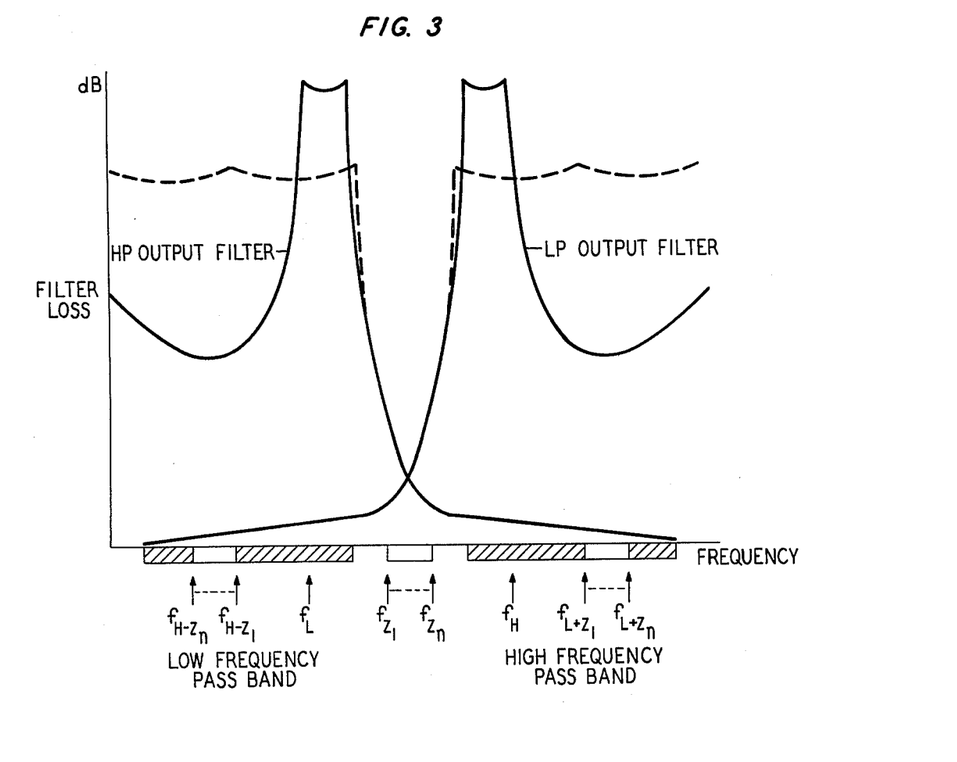

As aforenoted, each repeater oscillator 111, 111' 111'' generates a tone uniquely identifiable to that repeater. FIG. 3, in addition to showing the filter loss characteristics of the output pass filters, shows the high and low transmission bands of the coaxial cable system. As shown in FIG. 3, the frequency of each repeater oscillator is chosen to lie in the unused cutapart frequency region between the high and low transmission bands. Since these oscillator signals lie neither in the high transmission band nor the low transmission band, they do not propagate in either direction along the system. Therefore, the signal level applied to the inputs of the high and low frequency amplifiers of each repeater can be set at a higher energy level without degrading the repeater load-carrying capability. In addition, since each repeater oscillator frequency lies outside the limits of the low and high communication bands, no transmission spectrum is consumed. As will be described in detail hereinbelow, modulation components are generated by each repeater amplifier by intermodulating the test signals transmitted from the low and high transmitting ends and the locally generated oscillator signals. These modulation components are at frequencies which can be uniquely associated with the particular repeaters in the coaxial cable system. Accordingly, the frequency of a modulation component identifies its source.

With reference to FIG. 2, the low frequency test signal having a frequency $f_L$ passes through the low pass input filter 105'. Low pass filter 105' has a pass band over the low frequency transmission band and a stop band over the high frequency transmission band. Since $f_L$ is within the low frequency transmission band, it is passed through low pass filter 105', virtually unattenuated, to the input of amplifier 106'. The locally generated test signal having a frequency $f_{z_i}$ is also coupled to the input of amplifier 106' through hybrid 114' and injected network 112'. A second order modulation component is generated by amplifier 106' at the frequency $f_L + f_{z_i}$, designated hereinafter as $f_{L+z_i}$, which lies in the high frequency transmission pass band. As shown in FIG. 3 by the dotted curve, a low pass filter at the output of amplifier 106' would normally attenuate this modulation component to prevent further transmission through the system. Low pass output filter 107' is designed, however, to have a controlled moderate level of loss at the frequency $f_{L+z_i}$ in its high frequency stop band at which this second order modulation component lies. Therefore, the second order modulation component generated by amplifier 106' in response to $f_L$ and $f_{z_i}$ will not be fully attenuated. Thus by designing low pass output filter 107' to have a loss characteristic of a type shown by the solid curve in FIG. 3, part of the energy of the second order component at frequency $f_{L+z_i}$ in the high frequency band is coupled to the high frequency transmission path. Since this modulation component lies within the high frequency transmission path, it is passed virtually unattenuated through high pass input filter 108', amplified by amplifier 109' and passed through high pass output filter 110' for transmission back to the low frequency transmitting end.

With reference again to FIG. 1, this second order modulation component at frequency $f_{L+z_i}$ is passed through a high pass filter 117 to a variable frequency detector 118 within test 101. Detector 118 is adjusted to receive a signal at the frequency $f_{L+z_i}$. The energy level of this signal is compared with a predetermined reference, from which comparison the modulation performance of the low band amplifier 206 within repeater no. $i$ can be determined.

Each output low pass filter is designed to have a controlled moderate level of loss over the frequency region at which repeater nos. 1, . . . ,$i$, . . . ,$n$ each generate second order modulation components at the unique frequencies $f_{L+z_1}, \ldots, f_{L+z_i}, \ldots, f_{L+z_n}$, respectively. The modulation performance of the low band amplifiers 106, 106', 106'' can be monitored by selectively adjusting detector 118 to each of these frequencies and measuring the energy levels of the returned modulation components. A faulty low band repeater amplifier is thus readily located.

Intermodulation performance of the high band amplifiers 109, 109', 109" of each repeater is monitored in a manner similar to that described hereinabove. Accordingly, the test signal generated by oscillator 121 at a frequency $f_H$ is coupled through high pass filter 122 onto the coaxial cable system at the high frequency transmitting end. This test signal, lying in the high frequency transmission band, is transmitted along the system to each repeater where each high band amplifier intermodulates the locally generated oscillator signal with this test signal transmitted from the high frequency transmitting end. With reference to FIG. 2, the high frequency test signal passes through the high pass input filter 108' which has a pass band over the high frequency transmission band and a stop band over the low frequency transmission band. Since $f_H$ is within the high frequency transmission band, it is passed virtually unattenuated to the input of high band amplifier 109'. The locally generated test signal having a frequency $f_{z_i}$ is also coupled to the input of amplifier 109' through hybrid 114' and injection network 113'. A second order modulation component is generated by amplifier 109' at the frequency $f_H - f_{z_i}$, designated hereinafter as $f_{H-z_i}$, which lies in the low frequency transmission pass band. As shown in FIG. 3 by the dotted curve, a high pass filter at the output of amplifier 109' would normally attenuate this modulation component to prevent further transmission through the cable system. High pass output filter 110' is designed, however, to have a controlled moderate level of loss at the frequency $f_{H-z_i}$ in its low frequency stop band at which this second order modulation component lies. Therefore, the second order modulation component generated by amplifier 109' in response to $f_H$ and $f_{z_i}$ will not be fully attenuated but will be passed, in part, to the output of the filter 110'. Thus, by designing high pass output filter 110' to have a loss characteristic of the type shown by the solid curve in FIG. 3, part of the energy of the second order component at frequency $f_{H-z_i}$ in the low frequency transmission band is coupled to the high frequency transmission path. Since this modulation component at frequency $f_{H-z_i}$ lies within the low frequency transmission path, it is passed virtually unattenuated through low pass input filter 105', amplified by amplifier 106' and passed unattenuated through low pass output filter 107' for transmission back to the high frequency transmitting end.

With reference again to FIG. 1, this second order modulation component at frequency $f_{H-z_i}$ is passed through a low pass filter 123 to a variable frequency detector 124 within test set 120. Detector 124 is adjusted to receive a signal at the frequency $f_{H-z_i}$. The energy level of this signal is compared with a predetermined reference, from which comparison the modulation performance of the high frequency band amplifier 109' within repeater no. $i$ can be determined.

Each output high pass filter is designed to have a controlled moderate level of loss over the frequency region at which repeaters no. 1, ... ,$i$, ... ,$n$ generate second order modulation components at the unique frequencies $f_{H-z_1}, \ldots, f_{H-z_i}, \ldots, f_{H-z_n}$, respectively. The modulation performance of the high band amplifiers 109, 109', 109" can be monitored by selectively adjusting detector 124 to each of these frequencies and measuring the energy levels of the returning modulation components. A faulty high band amplifier is thus readily located.

A cable fault can be readily found by examining the modulation components returned to the low frequency transmitting end and the high frequency transmitting end. For example, if the modulation component at frequencies $f_{L+z_1}, \ldots f_{L+z_i}$ are the only components measurable by detector 118 and modulation components at frequencies $f_{H-z_{i+1}}, \ldots f_{H-z_n}$ are the only components measurable by detector 124, a cable fault can be determined to exist between repeater no. $i$ and repeater no. $i+1$. Thus, the system illustrated in FIG. 1 can be employed to both monitor the modulation performance of the high low band amplifiers within each repeater in the coaxial cable system and to determine the location of cable faults.

In order to minimize distortion, prevent unwanted feedback, and prevent singing, it is desirable that the sum of the filter losses in the high and low frequency bands form a predetermined loss versus frequency characteristic. Therefore, when the output pass band filters are designed to have a substantially lower loss characteristic over a portion of their stop bands, the input pass band filters are designed to have an increased level of attenuation over these same portions of their stop bands.

Figure 4:
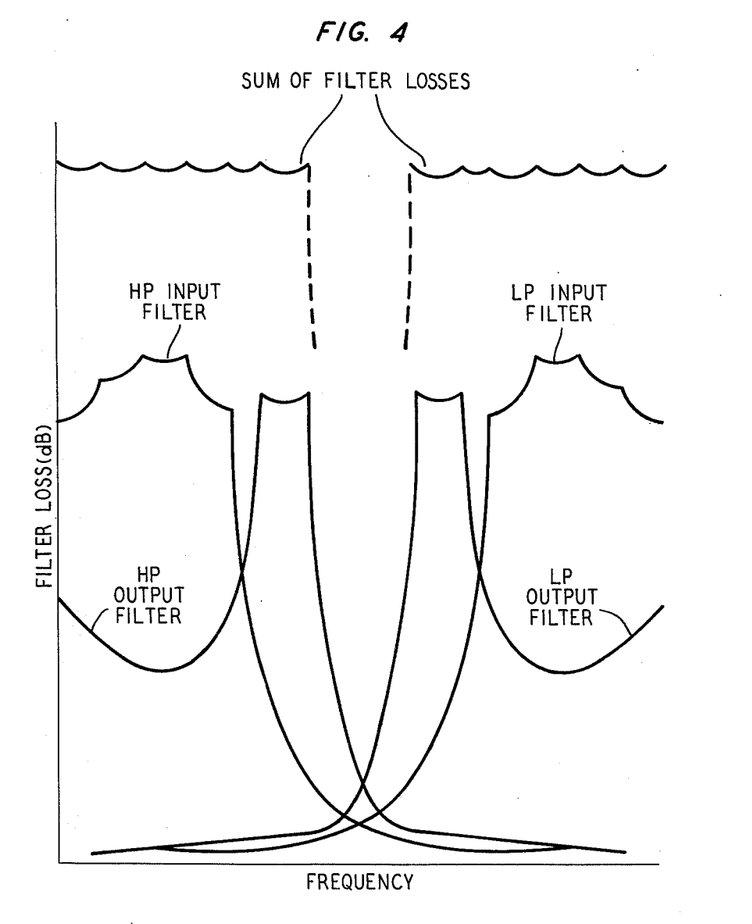
FIG. 4 shows the filter loss versus frequency characteristics of the input and output filters for the high and low bands in a preferred embodiment of the repeater in FIG. 2.

FIG. 4 illustrates the loss characteristics of the high pass input and output filters and the low pass input and output filters. The characteristics of the output pass band filters are the same as those illustrated in FIG. 3. The filter loss of the input filters, however, has an increased level of attenuation over those portions in the stop bands in which the output filters have a decreased level of attenuation such that the sum of filter losses approximates the desired loss versus frequency characteristic illustrated in FIG. 4.

Figure 5:
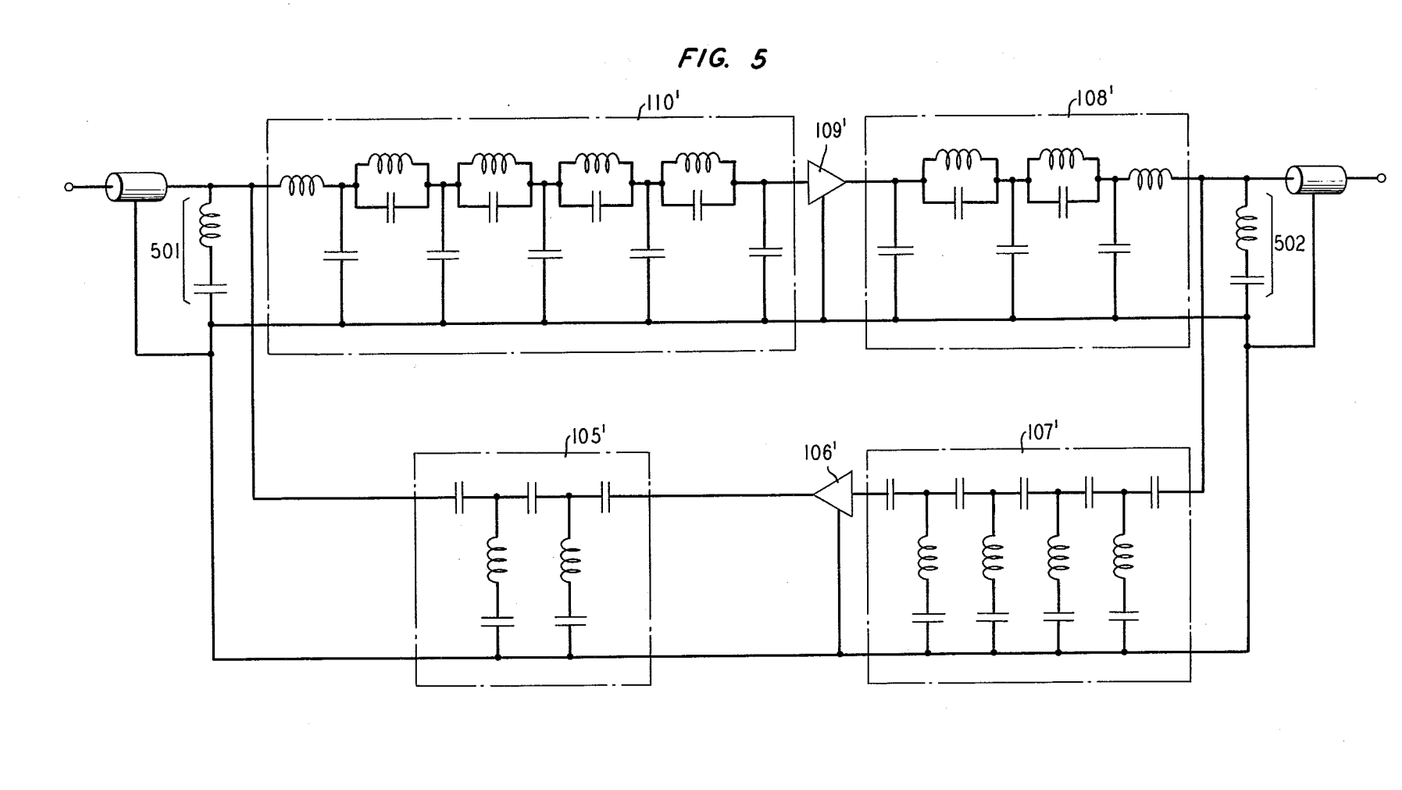
FIG. 5 shows a schematic circuit diagram of the high frequency transmission portion of the repeater of FIG. 2.

FIG. 5 shows a schematic circuit diagram of a repeater which includes networks which can be employed for the high pass input and output filters and the low pass input and output filters. Susceptance correcting networks 501 and 502 are shown in FIG. 5 connected across the repeater terminals. Similar numerical designations are used in FIG. 5 for those network components which correspond to components in FIG. 2. As can be observed, each filter includes a combination of passive inductors and capacitors. Once given the frequency range of the high and low bands and desired levels of attenuation, an optimum selection of component values can be readily determined by one skilled in the art.

Various modifications of this invention can be made without departing from the spirit and scope of the invention. For example, it is not necessary to include an oscillator at each repeater. With reference to FIG. 1, test set 101 could transmit two test tones which lie in the low frequency transmission band. Each low band repeater amplifier would intermodulate these test tones to generate a second order modulation component lying in the high frequency pass band. The low pass filter at the output of each low band amplifier would be designed to have a controlled moderate loss at the frequency of the second order component. Each second order modulation component would be coupled back to the test set where the returned modulation components could be identified in accordance with the unique delay times associated with each repeater in the coaxial cable system. Similarly, test set 120, at the high frequency transmitting end, would transmit two test tones lying in the high frequency transmission band, which when intermodulated by each high band amplifier, would generate modulation components lying in the low frequency pass band. The modulation components returned to test set 120 could be identified in accordance with their unique delay times.

The above-described arrangement is illustrative of the application and principles of the invention. Other embodiments may be devised by those skilled in the art without departing from the spirit and scope of the invention.

What is claimed is:

1. A repeater having a low frequency transmission path for transmission in a low frequency pass band between a first terminal and a second terminal and a high frequency transmission path for transmission in a high frequency pass band between said second terminal and said first terminal comprising first low pass filtering means, first amplifying means, and second low pass filtering means serially connected between said first and said second terminals in said low frequency transmission path, first high frequency filtering means, second amplifying means, and second high pass filtering means serially connected between said second terminal and said first terminal in said high frequency transmission path characterized in that
said second low pass filtering means has a loss characteristic of a sufficiently low magnitude over a portion of said high frequency pass band to couple part of the output of said first amplifying means in said portion of said high frequency pass band to said high frequency transmission path, and said second high pass filtering means has a loss characteristic of a sufficiently low magnitude over a portion of said low frequency pass band to couple part of the output of said second amplifying means in said portion of said low frequency pass band to said low frequency transmission path.

2. A repeater as defined in claim 1 further characterized in that said first low pass filtering means has a loss characteristic of a sufficiently high magnitude over said portion of said high frequency pass band, and said first high pass filtering means has a loss characteristic of a sufficiently high magnitude over said portion of said low frequency pass band, the sum of the loss characteristics of said first and second low pass filtering means and said first and second high pass filtering means providing a predetermined loss versus frequency characteristic over said low frequency pass band and said frequency pass band.

3. A repeater as defined in claim 2 further characterized in that oscillator means for generating a signal at a frequency between said low frequency pass band and said high frequency pass band is connected to the inputs of said first amplifying means and said second amplifying means.

4. A repeater for a coaxial cable system comprising a first transmission path for transmission in one direction in a low frequency pass band between a first and a second repeater terminal, a second transmission path for transmission in another direction in a high frequency band between said second and first repeater terminals, first low pass filtering means, first amplifying means, and second low pass filtering means serially connected in said first transmission path, said second low pass filtering means having a controlled moderate level of loss over a portion of said high frequency band to couple part of the output of said first amplifying means in said portion of said high frequency band to said second transmission path, first high pass filtering means, second amplifying means, and second high pass filtering means serially connected in said second transmission path, said second high pass filtering means having a controlled moderate level of loss over a portion of said low frequency band to couple part of the output of said second amplifying means to said first transmission path.

5. A repeater as defined in claim 4 wherein said first low pass filtering means has a sufficiently high level of loss over said portion of said high frequency band, and said first high pass filtering means has a sufficiently high level of loss over said portion of said low frequency band such that the sum of the levels of loss of the said first and second low pass filtering means and said first and second high pass filtering means forms a predetermined loss versus frequency characteristic over said low frequency band and said high frequency band.

6. A repeater as defined in claim 5 further comprising oscillator means for generating a signal at a frequency between said low frequency band and said high frequency band at the inputs of said first amplifying means and said second amplifying means.

7. An arrangement for locating a faulty one of a plurality of repeaters, each repeater having first low pass filtering means, first amplifying means, and second low pass filtering means serially connected in a first transmission path between a first terminal and a second terminal for amplifying signals transmitted in a low frequency band in one direction, and first high pass filtering means, second amplifying means, and second high pass filtering means serially connected in a second transmission path between said second terminal and said first terminal for amplifying signals transmitted in a high frequency band in the opposite direction, said repeaters being spaced along a transmission line between a low frequency transmitting end and a high frequency transmitting end, said arrangement comprising means at said low frequency transmitting end to apply a first test signal at a frequency in said low frequency band to said transmission line, means at said high frequency transmitting end to apply a second test signal at a frequency in said high frequency band to said transmission line, means associated with each repeater for generating a test signal at the inputs of said first and second amplifying means at a frequency uniquely identifiable to each repeater, said first amplifying means of each repeater intermodulating said first test signal and the test signal identifiable with that repeater to generate at least one modulation component at a frequency in said high frequency band, said second amplifying means of each repeater intermodulating said second test signal and the test signal identifiable with the repeater to generate at least one modulation component at a frequency in said low frequency band, said second low pass filtering means of each repeater having a loss characteristic of a sufficiently low magnitude over a portion of said high frequency band in which the frequencies of said at least one modulation component generated by said first amplifying means of each of said plurality of repeaters lie, said second low pass filtering means of each repeater coupling the at least one modulation component generated in said portion of said high frequency band to said high frequency transmission path for transmission to said low frequency transmitting end, means at said low frequency transmitting end to detect the modulation components generated by said first amplifying means in each repeater at frequencies in said portion of said high frequency band, said second high pass filtering means of each repeater having a loss characteristic of a sufficiently low magnitude over a portion of said low frequency band in which the frequencies of said at least one modulation component generated by said second amplifying means of each of said plurality of repeaters lie, said second high pass filtering means of each repeater coupling the at least one modulation component generated in said portion of said low frequency band to said low frequency transmission path for transmission to said high frequency transmitting end, and means at said high frequency transmitting end to detect the modulation components generated by said second amplifying means in each repeater at frequencies in said portion of said low frequency band.

8. An arrangement as defined in claim 7 wherein the first low pass filtering means of each repeater has a loss characteristic of a sufficiently high magnitude over said portion of said high frequency band, and the first high pass filtering means of each repeater has a loss characteristic of a sufficiently high magnitude over said portion of said low frequency band, the sum of the loss characteristics of said first and second low pass filtering means and said first and second high pass filtering means of each repeater forming a predetermined loss versus frequency characteristic over said low frequency band and said high frequency band.

9. An arrangement as defined in claim 7 wherein said means associated with each repeater for generating a test signal is operative at a frequency in the cutapart region between the low frequency band and the high frequency band.

10. An arrangement for measuring the modulation performance of a repeater having first low pass filtering means, first amplifying means, and second low pass filtering means serially connected in a first transmission path between a first terminal and a second terminal for amplifying signals transmitted in a low frequency band in one direction, and first high pass filtering means, second amplifying means, and second high pass filtering means serially connected in a second transmission path between said second terminal and said first terminal for amplifying signals transmitted in a high frequency band in the opposite direction, said repeater being connected in a transmission line between a low frequency transmitting end and a high frequency transmitting end, said arrangement comprising means at said low frequency transmitting end to apply a first test signal at a frequency in said low frequency band to said transmission line, means at said high frequency transmitting end to apply a second test signal at a frequency in said high frequency band to said transmission line, means for applying a third test signal to said first and second amplifying means of said repeater, said first amplifying means intermodulating said first test signal and said third test signal to generate at least one modulation component at a frequency in said high frequency band, said second amplifying means intermodulating said second test signal and said third test signal to generate at least one modulation component at a frequency in said low frequency band, said second low pass filtering means having a loss characteristic of a sufficiently low magnitude over a portion of said frequency band in which the frequency of said at least one modulation component generated by said first amplifying means lies, said second low pass filtering means coupling the at least one modulation component generated in said portion of said high frequency band to said high frequency transmission path for transmission to said low frequency transmitting end, means at said low frequency transmitting end to detect the at least one modulation component coupled from said first amplifying means to said high frequency transmitting path, said second high pass filtering means having a loss characteristic of a sufficiently low magnitude over a portion of said high frequency band in which the frequency of said at least one modulation component generated by said second amplifying means lies, said second high pass filtering means coupling the at least one modulation component in said portion of said low frequency band to said low frequency transmission path for transmission to said high frequency transmitting end, means at said high frequency transmitting end to detect the at least one modulation component coupled from said second amplifying means to said low frequency transmission path.

11. An arrangement as defined in claim 10 wherein the first low pass filtering means has a loss characteristic of a sufficiently high magnitude over said portion of said high frequency band, and the first high pass filtering means has a loss characteristic of a sufficiently high magnitude over said portion of said low frequency band, the sum of the loss characteristic of said first and second low pass filtering means and said first and second high pass filtering means forming a predetermined loss versus frequency characteristic over said low frequency band and said high frequency band.

12. An arrangement as defined in claim 11 wherein said means for applying a third test signal generates a signal at a frequency in the cutapart region between the low frequency band and the high frequency band.

* * * * *

UNITED STATES PATENT AND TRADEMARK OFFICE
CERTIFICATE OF CORRECTION

PATENT NO. : 4,025,737
DATED : May 24, 1977
INVENTOR(S) : Sherman T. Brewer

It is certified that error appears in the above-identified patent and that said Letters Patent are hereby corrected as shown below:

```
Column 1, line 13, change "repeates" to --repeaters--;
line 24, delete "of repeater amplifiers"; line 28,
change "amplifierss" to --amplifiers--.
```

Signed and Sealed this

Twelfth Day of December 1978

[SEAL]

Attest:

RUTH C. MASON
Attesting Officer

DONALD W. BANNER
Commissioner of Patents and Trademarks